United States Patent
Bianchi et al.

(10) Patent No.: US 8,412,053 B2
(45) Date of Patent: *Apr. 2, 2013

(54) RADIOISOTOPE POWERED LIGHT MODULATING COMMUNICATION DEVICES

(75) Inventors: Maurice P. Bianchi, Palos Verdes Estates, CA (US); David A. Deamer, Seal Beach, CA (US); Timothy R. Kilgore, Orange, CA (US)

(73) Assignee: The Boeing Company, Chicago, IL (US)

( * ) Notice: Subject to any disclaimer, the term of this patent is extended or adjusted under 35 U.S.C. 154(b) by 691 days.

This patent is subject to a terminal disclaimer.

(21) Appl. No.: 12/573,417

(22) Filed: Oct. 5, 2009

(65) Prior Publication Data
US 2010/0084571 A1    Apr. 8, 2010

Related U.S. Application Data

(60) Provisional application No. 61/103,372, filed on Oct. 7, 2008.

(51) Int. Cl.
*H04B 10/04* (2006.01)
(52) U.S. Cl. ............ 398/201; 398/182; 398/118; 372/73
(58) Field of Classification Search .......... 398/118–131, 398/182–201
See application file for complete search history.

(56) References Cited

U.S. PATENT DOCUMENTS

| | | | |
|---|---|---|---|
| 3,391,281 A * | 7/1968 | Erkens | 372/73 |
| 3,559,095 A * | 1/1971 | Nielson | 372/73 |
| 3,667,068 A | 5/1972 | Morrison et al. | |
| 5,015,863 A | 5/1991 | Takeshima et al. | |
| 5,229,320 A | 7/1993 | Ugajin | |
| 5,260,957 A | 11/1993 | Hakimi et al. | |
| 5,293,050 A | 3/1994 | Chapple-Sokol et al. | |
| 5,482,890 A | 1/1996 | Liu et al. | |
| 5,512,762 A | 4/1996 | Suzuki et al. | |
| 5,559,822 A | 9/1996 | Pankove et al. | |
| 5,684,309 A | 11/1997 | McIntosh et al. | |
| 5,888,885 A | 3/1999 | Xie | |
| 5,906,670 A | 5/1999 | Dobson et al. | |
| 6,768,754 B1 | 7/2004 | Fafard | |
| 7,103,079 B2 | 9/2006 | McInerney et al. | |
| 7,183,718 B2 | 2/2007 | Yoshida | |
| 7,192,999 B2 | 3/2007 | Mercado et al. | |
| 7,264,527 B2 * | 9/2007 | Bawendi et al. | 445/24 |
| 2001/0043380 A1 * | 11/2001 | Ohtsubo | 359/159 |
| 2002/0001115 A1 * | 1/2002 | Ishida et al. | 359/180 |

(Continued)

OTHER PUBLICATIONS

Vutha, Amar C., et al., "Random laser action in ZnO doped polymer", Journal of Applied Physics, 99, 123509-1-123509-4 (2006).

(Continued)

*Primary Examiner* — Li Liu
(74) *Attorney, Agent, or Firm* — Christopher J. Knors; Moore & Van Allen PLLC

(57) ABSTRACT

The present disclosure relates to a light modulating communication device comprising a housing comprising at least one inner chamber, and an opening, at least one quantum dot positioned inside the at least one inner chamber, a high-energy emitting source positioned within the at least one inner chamber, a modulator positioned proximal to the opening of the housing, and optionally, at least one reflector positioned within the at least one inner chamber. The present disclosure also relates to a method comprising providing at least one quantum dot, contacting the at least one quantum dot with high-energy particles such that light is produced from the at least one quantum dot, and modulating the light produced from the at least one quantum dot.

20 Claims, 10 Drawing Sheets

U.S. PATENT DOCUMENTS

| | | | |
|---|---|---|---|
| 2005/0152429 A1 | 7/2005 | Scherer | |
| 2006/0261325 A1* | 11/2006 | Zanrosso et al. | 257/14 |
| 2008/0175292 A1 | 7/2008 | Sheik-Bahae | |
| 2010/0028005 A1* | 2/2010 | Beckett | 398/79 |
| 2010/0084571 A1 | 4/2010 | Bianchi et al. | |
| 2010/0098125 A1* | 4/2010 | Bianchi et al. | 372/40 |

OTHER PUBLICATIONS

Non-Final Office Action for U.S. Appl. No. 12/577,746 dated Oct. 25, 2011.

Biersack et al.; Ion Beam Induced Changes of the Refractive Index of PMMA; Nuclear Instruments and Methods in Physics Research B46; 1990; pp. 309-312, Elsevier Science Publishers B.V. (North-Holland).

Calvert; Vegetable and mineral; Nature; Oct. 1991; pp. 501-502; vol. 353; Nature Publishing Group.

Dabbousi et al.; (CdSe)ZnS Core-Shell Quantum Dots: Synthesis and Characterization of a Size Series of Highly Luminescent Nanocrystallites; The Journal of Physical Chemistry B; 1997; V101; pp. 9463-9475; American Chemical Society.

Finlayson et al.; Infrared Emitting PbSe Quantum Dots for Telecommunication—Window Applications; OSA/ ASSP 2005.

Franklin et al.; Refractive Index Matching: A General Method for Enhancing the Optical Clarity of a Hydrogel Matrix; Chemisty of Materials; 2002; pp. 4487-4489; 14; American Chemical Society.

Hecht, Jeff; *"The Laser Book"*, $2^{nd}$ Ed., Tab Books, Blue Ridge Summit, PA, (1992); ISBN 0-07-027737-0; pp. 389-417 (Chapter 22).

Hines et al.; Synthesis and Characterization of Strongly Luminescing ZnS-Capped CdSe Nanocrystals; J. Phys. Chem.; 1996; pp. 468-471; 100; American Chemical Society.

Jiang et al., "Transparent Electro-Optic Ceramics and Devices," Optoelectronic Devices and Integration. Edited by Ming, Hai; Zhang, Xuping; Chen, Maggie Yihong. Proceedings of the SPIE, vol. 5644, pp. 380-394 (2005).

Jiang et al.; Optimizing the Synthesis of Red-to Near-IR-Emitting CdS-Capped $CdTe_xSe_{1-x}$ Alloyed Quantum Dots for Biochemical Imaging; Chem. Mater.; 2006; pp. 4845-4854; 18; American Chemical Society.

Jin et al.; $Gd^{3+}$-functionalized near-infrared quantum dots for in vivo dual modal (fluorescence/magnetic resonance) imaging; Chem. Commun.; 2008; pp. 5764-5766; The Royal Society of Chemistry 2008.

Klonkowski et al.; Emission enhancement of Eu(III) and/or Tb(III) ions entrapped in silica xerogels with ZnO nanoparticles by energy transfer; Journal of Non-Crystalline Solids; 352; 2006; pp. 4183-4189; Elsevier B.V.

Krier et al.; Mid-infrared electroluminescence from InAsSb quantum dot light emitting diodes grown by liquid phase epitaxy; Physica E 15; 2002; pp. 159-163; Elsevier Science B.V.

Kuntz et al.; 10Gbit/s data modulation suing 1.3 pm InGaAs quantum dot lasers; Electronic Letters; Mar. 3, 2005; vol. 41, No. 5; IEE.

Leon; Intermixing induced tunability in infrared emitting InGaAs/GaAs quantum dots; SPIE; Jul. 1999; vol. 3794; Part of the SPIE Conference Materials for High-Speed Detectors; Denver, CO, US.

Madler et al.; Rapid synthesis of stable ZnO quantum dots; Journal of Applied Science; vol. 92, No. 11; Dec. 1, 2002; pp. 6537-6540; American Institute of Physics.

Mao et al.; Synthesis of high-quality near-infrared-emitting CdTeS alloyed quantum dots via the hydrothermal method; Nanotechnology; 2007; 485611 (7pp); 18; 10P Publishing Ltd.; UK.

Novak; Hybrid Nanocomposite Materials—Between Inorganic Glasses and Organic Polymers; Advanced Materials; 1993; pp. 422-433; 5, No. 6; VHC Verlagsgesellschaft mbH, D-69469 1993.

Otsubo et al.; Temperature-Insensitive Eye-Opening under 10-Gb/s Modulation of 1.3-pm P-Doped Quantum- Dot Lasers without Current Adjustments; Japanese Journal of Applied Physics; 2004; pp. L1124-L1126; vol. 43, No. 8B; The Japan Society of Applied Physics.

Peng et al.; Epitaxial Growth of Highly Luminescent CdSe/CdS Core/Shell Nanocrystals with Photostability and Electronic Accessibility; J. Am. Chem.Soc.; 1997; V119; pp. 7019-7029; American Chemical Society.

Peng et al.; Formation of High-Quality CdTe, CdSe, and CdS Nanocrystals Using CdO as Precursor; J. Am. Chem. Soc.; 2001; vol. 123, No. 1; pp. 183-184; American Chemical Society.

Qu et al.; Alternative Routes toward High Quality CdSe Nanocrystals; Nano Letters; 2001; pp. 333-337; vol. 1, No. 6; American Chemical Society.

Schaller et al., Seven Excitons At a Cost of One: Redefining the Limits for Conversion Efficiency of Photons Into Charge Carriers Nano Lett. Mar. 2006;6(3):424-9.

Shabaev et al., Multiexciton Generation by a Single Photon in Nano crystals, Nano Lett. (2006) 6(12).

Shan et al.; The structure and character of CdSe nanocrystals capped ZnO layer for phase transfer from hexane to ethanol solution; Surface Science; 582; 2005; pp. 61-68; Elsevier B.V.

Song et al., Red light emitting solid state hybrid quantum dot—near-UV GaN LED devices Nanotechnology 2007 18 255202 (4pp).

Ulrich; Prospects for Sol-Gel Processes; Journal of Non-Crystalline Solids; 1990; pp. 465-479; 121; Elsevier Science Publishers B.V. (North-Holland).

Wasserman et al.; Mid-Infrared Electroluminescence from InAs Self-Assembled Quantum Dots; Proc. of SPIE; 2006; vol. 6386, 6386E-1.

Wu et al; Surface modification of ZnO nanocrystals; Applied Surface Science; 253; 2007; pp. 5473-5479; Elsevier B.V.

Zhang et al.; Wet-Chemical Synthesis of ZnTe Quantum Dots; Mater. Res. Soc. Symp. Proc.; 2006; vol. 942; Materials Research Society.

* cited by examiner

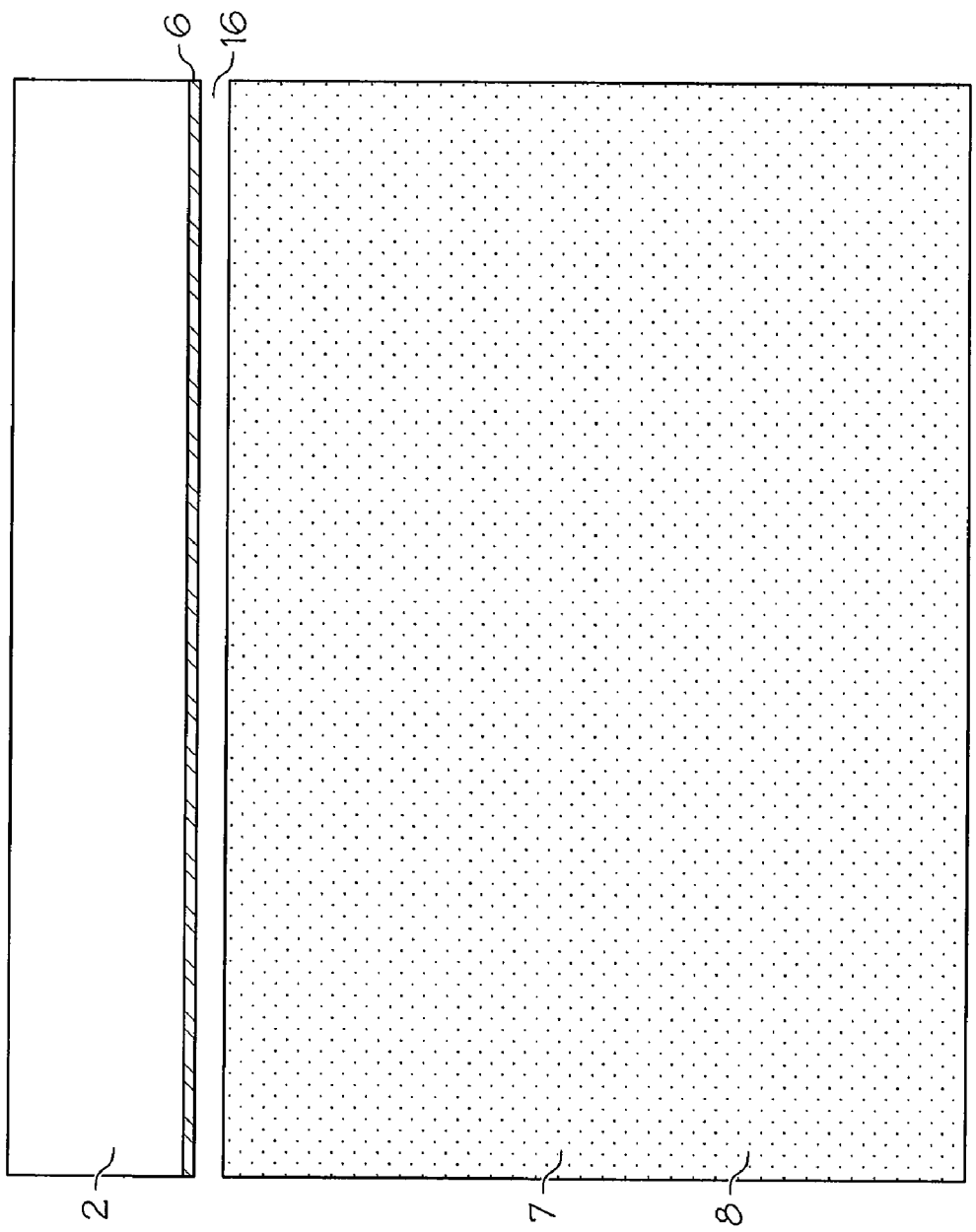

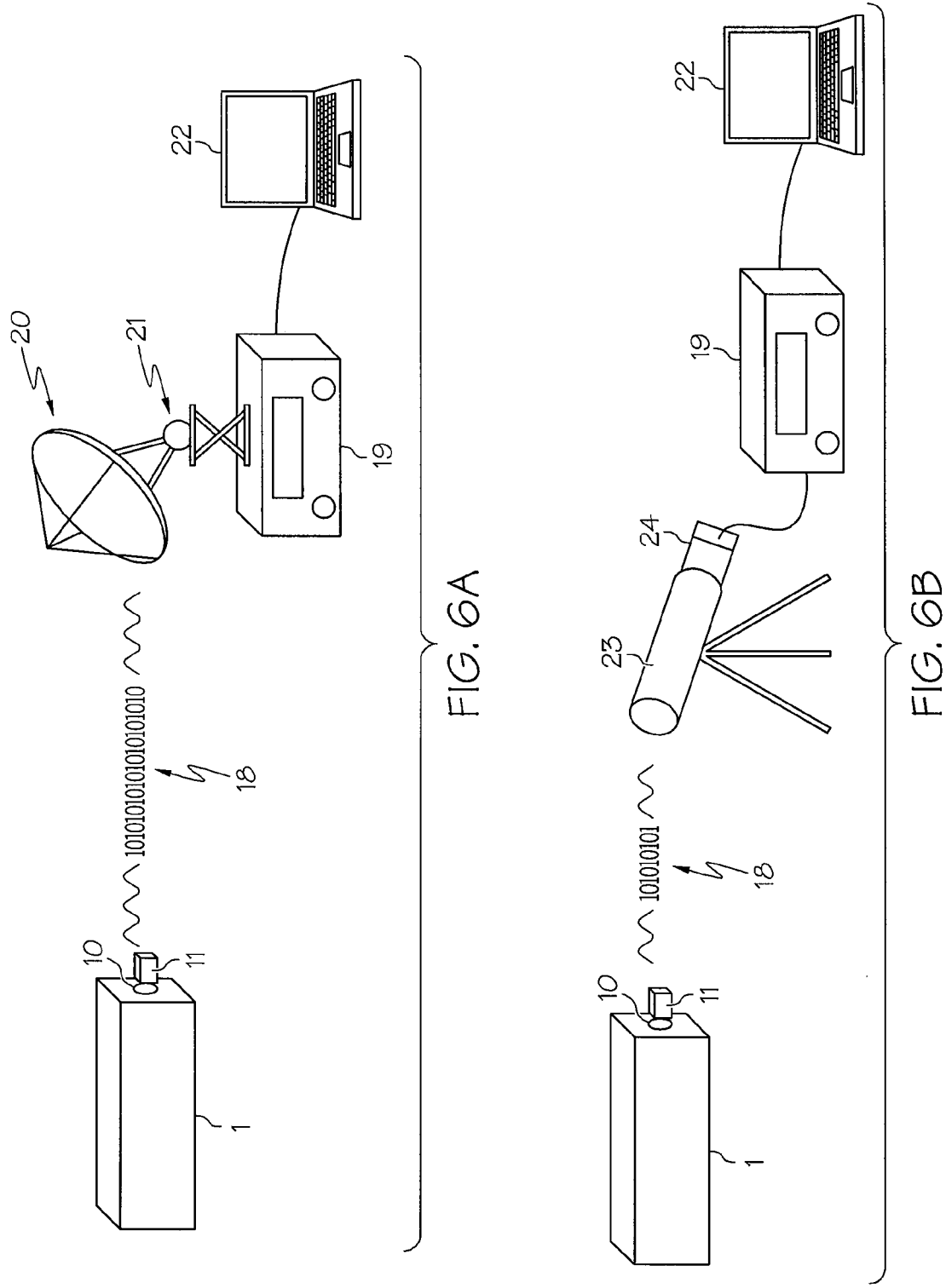

RADIOISOTOPE POWERED LIGHT MODULATING COMMUNICATION DEVICES

CROSS-REFERENCE TO RELATED APPLICATIONS

This application claims benefit of priority under 35 U.S.C. §119(e) to the filing date of U.S. Provisional Application Ser. No. 61/103,372, filed on Oct. 7, 2008, which is incorporated herein by reference in its entirety.

TECHNICAL FIELD

The present disclosure relates generally to light modulation communication devices. More particularly, the present disclosure relates to novel optical communication devices that utilize a high-energy emitting source, quantum dots and a modulator for the generation and high speed modulation of light to produce rapidly changing signals at a high data rate from one point to another.

BACKGROUND

All electrical and electronic equipment require a steady supply of electrical power over their lifetime. On earth, virtually all electronic equipment receive their electrical power from convenient power lines connected to power plants. However, there are many instances where it is impractical or impossible to provide electrical power via a power line or cable. In the case of optical communications devices, such as satellites, navigation buoys and the like, light is typically generated through lasers powered by batteries, generators, or by solar power. However, these sources of power have their drawbacks. For example, batteries and generators often have short operating lives before needing recharging, replacement and/or refueling. Similarly, solar power requires the need for expensive solar cells that utilize large surface areas and are often expensive, fragile and vulnerable to the elements. Furthermore, contact with sunlight is not constant, thereby necessitating the need for storage batteries to provide power during times of darkness. These are critical problems for those devices used in space applications (e.g., satellites) or optical communication devices that are located in hard to reach places.

As such, it would be advantageous to provide a power source for an optical communication device that provides long-lasting, uninterrupted power to generate light for use in optical communication.

SUMMARY

The present disclosure relates to a self-contained and self-powered light modulation device that comprises a high-energy emitting source, at least one quantum dot, at least one reflector, and a modulator. The devices of the present disclosure are able to operate for long periods of time (e.g., for at least the half-life of the radioisotope) without the need for an outside source of power or the need to recharge or refuel the device, therefore making the devices of the present disclosure ideal for use in remote locations or space applications.

In a first embodiment of the disclosure, a light modulation communication device is provided. The device comprises a housing comprising at least one inner chamber and an opening. At least one quantum dot is positioned inside the inner chamber, wherein the quantum dot comprises CdS, CdSe, CdTe, ZnS, or ZnSe. A high-energy emitting source is positioned within the at least one inner chamber, where the high-energy emitting source is a radioisotope. At least one reflector is positioned within the at least one inner chamber, and an aperture is positioned proximal to the opening of the housing. A modulator is positioned proximal to the opening of the housing, where the modulator is $LiNbO_3$ or $Pb_{1-x}La_x(Zr_yTi_{1-y})_{1-x/4}O_3$ (PLZT).

In a first aspect of the first embodiment, the light modulation communication device further comprises a high emittance coating that covers the outside of the housing, thereby helping to dissipate the heat generated therein. In certain embodiments, the high emittance coating is selected from the group consisting anodized aluminum, aluminum oxide, zinc oxide, magnesium oxide, composites thereof and combinations thereof. In preferred embodiments, the high emittance coating is anodized aluminum.

In a second aspect of the first embodiment, the light modulation communication device further comprises an insulation layer between the housing and the high-energy emitting source. In certain embodiments, the insulation layer is boron nitride or aluminum oxide. In preferred embodiments, the insulation layer is boron nitride.

In a third aspect of the first embodiment, the light modulation communication device further comprises an additional heat sink material that is in thermal communication with the high-energy emitting source.

In a forth aspect of the first embodiment, the high energy emitting source emits subatomic particles that come into contact with the at least one quantum dot. In certain embodiment, the radioisotope emits alpha or beta particles. Suitable radioisotopes include, but are not limited to, thallium-204, plutonium-238, curium-244, strontium-90, polonium-210, promethium-147, caesium-137, cerium-144, ruthenium-106, cobalt-60, curium-242, and americium-241. In certain embodiments, the high-energy emitting source is thallium-204. In another embodiment, the high-energy emitting source is in the form of a coating positioned along a surface of the inner chamber. In another embodiment, the high-energy emitting source is located along a central core located within the inner chamber.

In a fifth aspect of the first embodiment, the quantum dot comprises an inert material. In certain embodiments, the size of the quantum dot is in a range of 1 nm to 50 nm, preferably 1 nm to 40 nm, more preferably 1 nm to 20 nm.

In a sixth aspect of the first embodiment, the quantum dot comprises a core selected from the group consisting of CdS, CdSe, CdTe, ZnS, ZnS, ZnSe, ZnTe, GaAs, GaP, GaAs, GaSb, HgS, HgSe, HgTe, InAs, InP, InSb, AlAs, AlP, AlSb, PbS, PbSe, PbTe alloys thereof, and combinations thereof.

In a seventh aspect of the first embodiment, the quantum dot further comprises a coating. In certain embodiments, the coating is selected from the group consisting of ZnO, ZnS, ZnSe, ZnTe, CdO, CdS, CdSe, CdTe, MgS, MgSe, GaAs, GaN, GaP, GaSb, HgO, HgS, HgSe, HgTe, InAs, InN, InP, InSb, AlAs, AlN, AlP, AlSb, alloys thereof, and combinations thereof.

In an eighth aspect of the first embodiment, the at least one quantum dot is dispersed in a matrix. In certain embodiments, the matrix is translucent or transparent. In one embodiment, the matrix is made of material selected from polyacrylate, polystyrene, polyimide, polyacrylamide, polyethylene, polyvinyl, poly-diacetylene, polyphenylene-vinylene, polypeptide, polysaccharide, polysulfone, polypyrrole, polyimidazole, polythiophene, polyether, epoxies, silica glass, silica gel, siloxane, polyphosphate, hydrogel, agarose, cellulose, Sol Gel, and the like. In another embodiment, the matrix is Sol Gel or polyacrylate.

In a ninth aspect of the first embodiment, the reflector comprises a highly polished metal, such as aluminum or copper, or a mirror.

In a tenth aspect of the first embodiment, the modulator comprises a transparent material coated with an electro-optic modulating material or a bulk material formed from electro-optic modulation material. In another embodiment, the electro-optic material is an electro-optic oxide. In certain embodiments, the electro-oxide is selected from the group consisting of $LiNbO_3$, $Pb_{1-x}La_x(Zr_yTi_{1-y})_{1-x/4}O_3$ (PLZT), $Pb(Mg_{1/3}Nb_{2/3})O_3$—$PbTiO_3$ (PMN-PT), and $Pb(Zn_{1/3}Nb_{2/3})O_3$—$PbTiO_3$ (PZN-PT).

In an eleventh aspect of the first embodiment, the modulator further comprises a focusing element. In certain embodiments, the focusing element comprises a lens.

In a twelfth aspect of the first embodiment, each inner chamber comprises quantum dots of the same diameter, such that the same color of light is produced within each inner chamber. In another embodiment, each inner chamber comprises quantum dots of varying diameter, such that one or more colors may be produced.

Another aspects of the disclosure comprises a system for communicating with modulated light comprising a light modulation communication device of the present disclosure, a receiver to collect the light generated by the light modulation communication device and convert the light into electrical signals, and a display means to display the electrical signals in a meaningful way to a user. The display means may be part of the receiver or a separate device, such as a computer. In another embodiment, the system may further comprise a collecting means to concentrate the light generated by the light modulation communication device to a sensor or sensor array that is then sent to the receiver. In certain embodiments, the collecting means is an optical sensor or parabolic dish.

Another aspect of the disclosure comprises a light modulating communication concentrator stack that comprises a housing, an opening, and a plurality of inner chambers; a plurality of quantum dots, wherein the plurality of quantum dots is dispersed in a matrix and positioned within the plurality of inner chambers; a plurality of reflectors, wherein the plurality of first reflector are positioned within the plurality of inner chambers and in optical communication with the plurality of quantum dots; a plurality of high-energy emitting sources, wherein the high-energy emitting sources are positioned within the plurality of inner chambers and in radioactive communication with the plurality of quantum dots; an aperture positioned proximal the opening of the housing; at least one second reflector positioned proximal to the opening of the housing; an aperture positioned proximal to the opening of the housing; wherein the aperture is in optical communication with the plurality of inner chambers; and a modulator, wherein the modulator is positioned proximal to the opening of the housing and is in optical communication with the aperture.

Another aspect of the present disclosure comprises a system comprising a light modulation device of the present disclosure, a receiver, and a display means, wherein the receiver collects light emitted from the device and converts the light into electrical signals, and the display means displays the electrical signals in a meaningful way to a user.

In another embodiment, the light modulation system further comprises a collecting means, wherein the collecting means concentrates the light emitted from the device to a sensor or sensor array, and thereby sends the concentrated signal to the receiver.

In another embodiment, the light modulation system comprises a light modulation communication device comprising a concentrator stack.

In a second embodiment, a method of producing a light modulation device is provided. The method comprises providing a housing having an opening, and an inner chamber; providing at least one quantum dot dispersed in a matrix; providing a high-energy emitting source positioned within the inner chamber in radioactive communication with the at least one quantum dot; providing at least one reflector positioned within the inner chamber and in optical communication with the at least one quantum dot; providing an aperture positioned proximal to the opening of the housing and in optical communication with the at least one quantum dot; and providing a modulator positioned in optical communication with the aperture.

In a third embodiment, a method is provided. The method comprises providing at least one quantum dot, contacting the at least one quantum dot with high-energy particles such that light is produced from the at least one quantum dot, and modulating the light produced from the at least one quantum dot, where modulated light is produced.

In a second aspect of the third embodiment, the method further comprises modulating the light at a rate sufficient to produce a communication signal.

In a third aspect of the third embodiment, the method further comprises amplifying the light by reflecting the light with a reflector and passing the amplified light through an aperture.

In a forth aspect of the third embodiment, the at least one quantum dot comprises a core selected from the group consisting of CdS, CdSe, CdTe, ZnS, ZnS, ZnSe, ZnTe, GaAs, GaP, GaAs, GaSb, HgS, HgSe, HgTe, InAs, InP, InSb, AlAs, AlP, AlSb, PbS, PbSe, PbTe; a coating selected from one or more of the group consisting of ZnO, ZnS, ZnSe, ZnTe, CdO, CdS, CdSe, CdTe, MgS, MgSe, GaAs, GaN, GaP, GaSb, HgO, HgS, HgSe, HgTe, InAs, InN, InP, InSb, AlAs, AlN, AlP, AlSb; and combinations of the core and the coating.

In a fifth aspect of the third embodiment, the high-energy emitting source is a radioisotope selected from the group of radioisotopes consisting of thallium-204, plutonium-238, curium-244, strontium-90, polonium-210, promethium-147, caesium-137, cerium-144, ruthenium-106, cobal-60, curium-242, and americium-241.

In a sixth aspect of the third embodiment, the modulator is an electro-optic oxide selected from the group of materials consisting of LiNbO3, Pb1-xLax(ZryTi1-y)1-x/4O3 (PLZT), Pb(Mg1/3Nb2/3)O3-PbTiO3 (PMN-PT), and Pb(Zn1/3Nb2/3)O3-PbTiO3 (PZN-PT).

Aspects of each embodiment may be combined. Various other aspects, features and embodiments will be more fully apparent from the ensuing discussion and appended claims.

BRIEF DESCRIPTION OF THE FIGURES

FIG. 5 is an exploded view of the light modulation device of the present disclosure representing the gap between the quantum dot matrix and radioisotope coating to prevent loss of photons by evanescent wave coupling.

FIGS. 6A and 6B are schematics representing how the light generated by the light modulation device of the present disclosure is transmitted, gathered and processed.

DETAILED DESCRIPTION

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, preferred methods and materials are described herein.

The articles "a" and "an" are used herein to refer to one or to more than one (i.e. at least one) of the grammatical object of the article. By way of example, "an element" means at least one element and can include more than one element.

Figure 1:
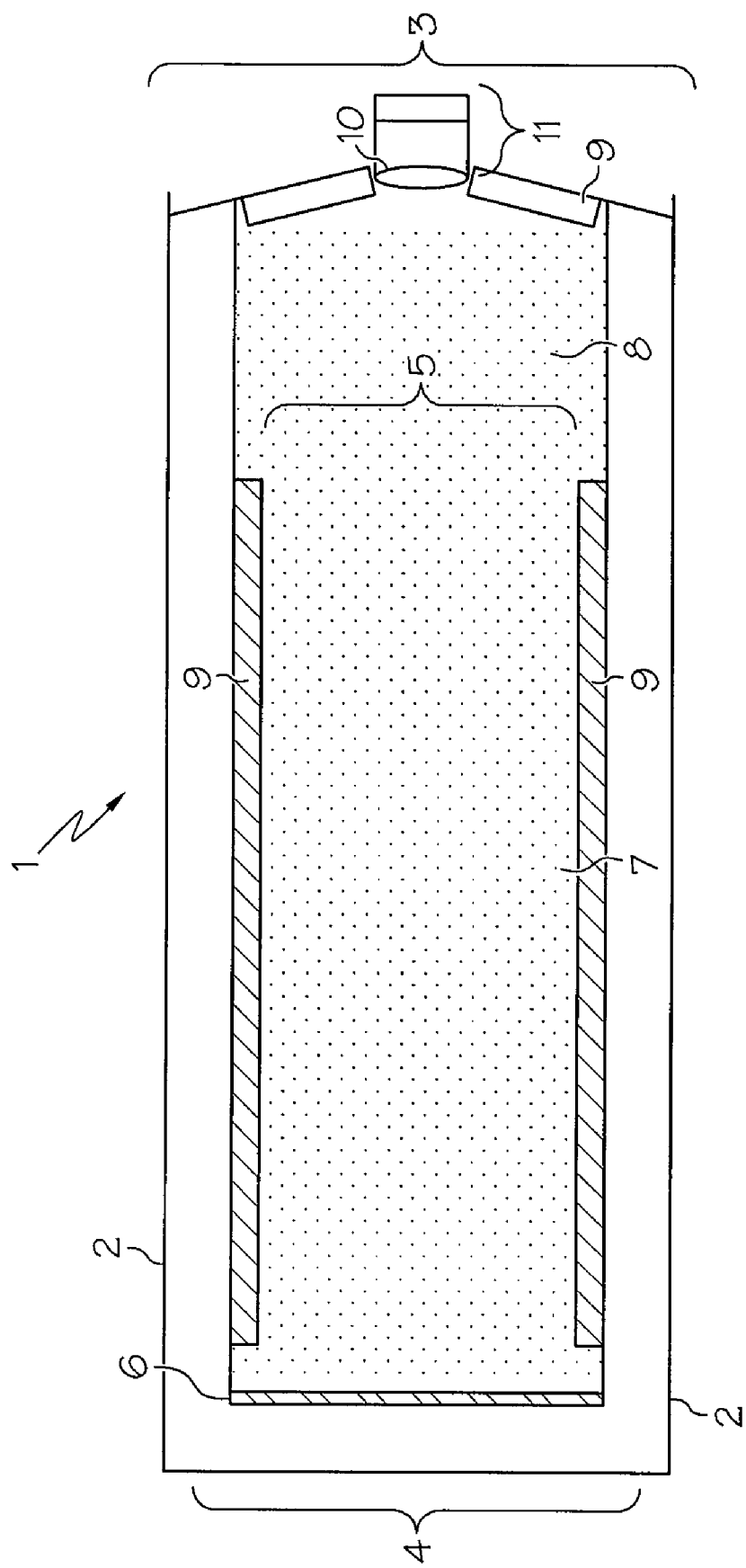
FIG. 1 represents one embodiment of a light modulation device of the disclosure.

In general terms, and as illustrated in FIG. 1, the present disclosure relates to a light modulation device 1 that comprises a housing 2, with an opening proximal to first end 3, a second end 4, and an inner chamber 5, a high-energy emitting source 6 positioned in the inner chamber 5, at least one quantum dot 7 dispersed in a matrix 8 positioned inside the inner chamber 5 and in radioactive communication with the high-energy emitting source 6, at least one reflector 9 positioned within the inner chamber 5 and in optical communication with the at least one quantum dot 7, an aperture 10 positioned proximal to the opening at the first end 3 of the housing 2 and a modulator 11 positioned in optical communication with the aperture 10.

As used herein, the terms "light" and "photon" are used interchangeably, and are defined as a discreet bundle of electromagnetic energy and is intended to include gamma rays, x-rays, ultraviolet rays, visible light, infrared light, microwaves and radiowaves.

The term "optical communication" as used herein is defined as the ability of an object to come into contact with light reflected by, or emitted from, a different object.

As used herein, the term "radioactive communication" refers to the ability of particles emitted from a high-energy emitting source to reach and excite the quantum dot.

Figure 2:
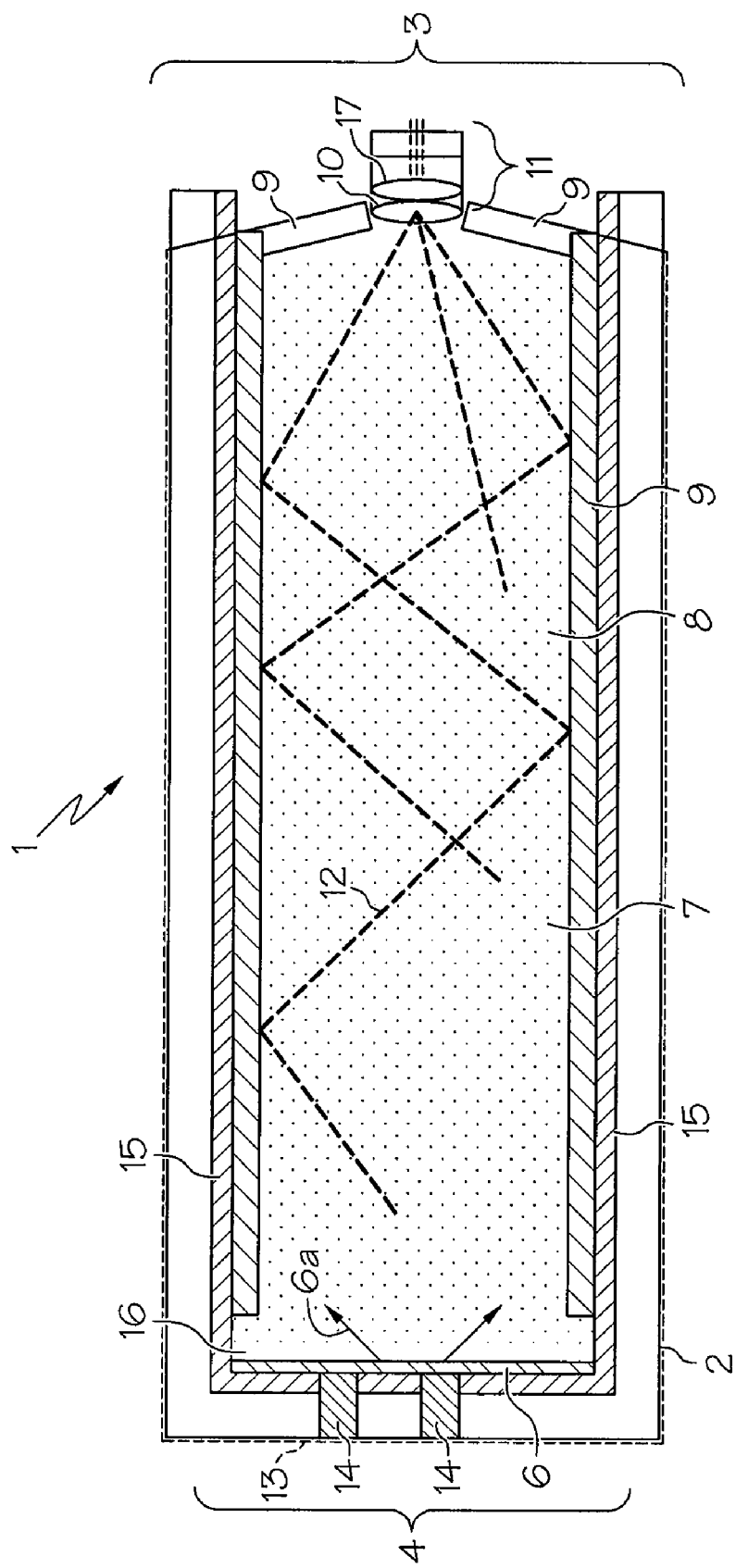
FIG. 2 represents another embodiment of a light modulation device of the disclosure and further depicting how photons generated by the quantum dots are reflected and gathered within the device.
Figure 3:
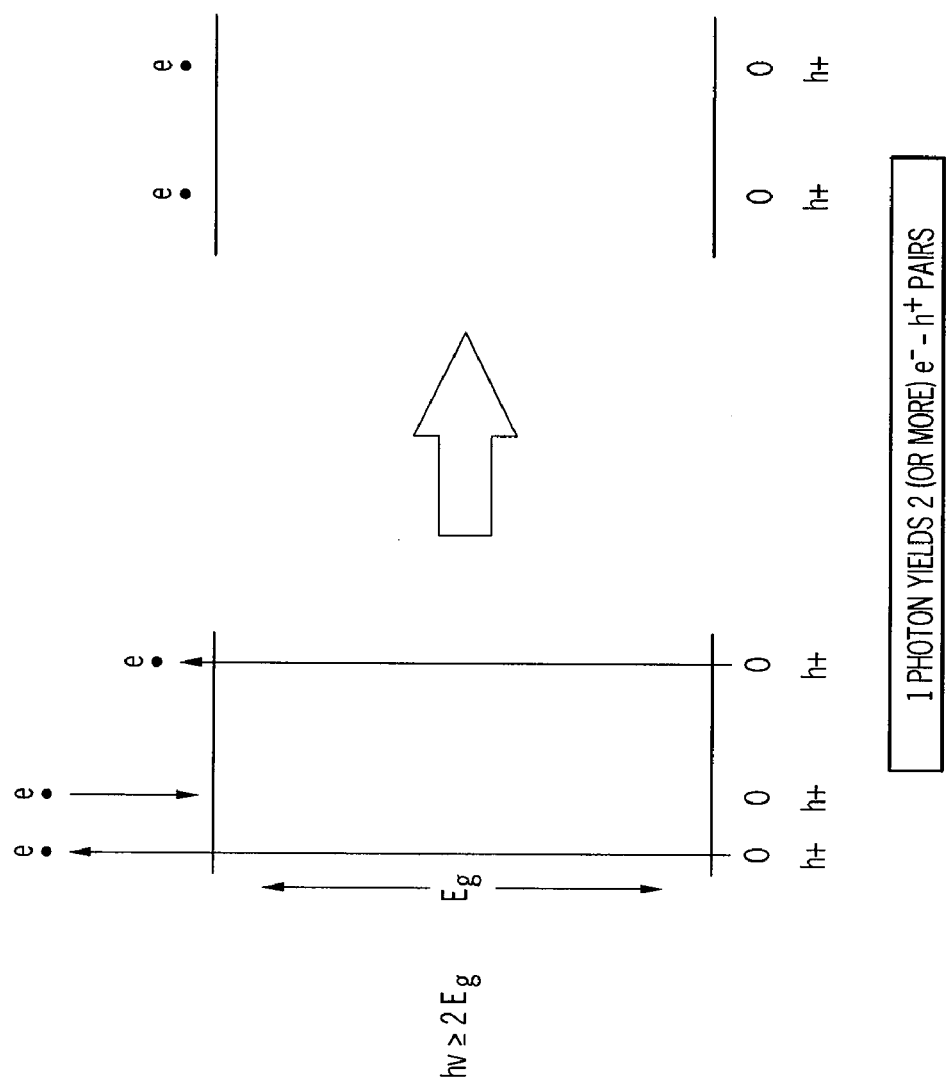
FIG. 3 is a diagram representing multi-excition generation for a 2 eV quantum dot.

In one aspect, the disclosure provides a light modulation device as described above. In referring to FIGS. 1 and 2, the device generally indicated at 1 comprises a housing 2 comprising an opening proximal to the first end 3, a second end 4, and an inner chamber 5. Within the inner chamber 5, the device comprises a high-energy emitting source 6, at least one quantum dot 7 operating at a desired wavelength dispersed within a matrix 8 which is in radiation communication with the high-energy emitting source 6, and at least one reflector 9 positioned in optical communication with the quantum dot 7. The high-energy 6a emitted from the high-energy emitting source 6 is absorbed by the quantum dots 7 which then produce electron hole pairs that recombine to emit photons 12 in a fairly narrow region centered around the bandgap of the quantum dot 7. As shown in FIG. 2, these photons 12 are then redirected by total internal reflection or reflection by the reflector 9 down to the aperture 10, whereby the photons are collected, focused and passed through the modulator 11, and out of the device 1. Without being bound by any theory, it is believed that an emission of multitudes of photons 12 from the quantum dot having a quantum-defined band gap of x eV contacted with the high-energy emitting source 6 (generated by the high-energy wave/particle 6a) of greater energy (at least 2× eV or more) than that of the quantum-defined band QD gap is provided by the process of multi-exciton generation (MEG). As shown in FIG. 3, the process of MEG involves the generation of multiple electron-hole pairs from the absorption of a single photon of energy greater than that of the quantum-defined band gap of the QD, thus considerably increasing the light emitting efficiency of the device.

As used herein, the term "housing" refers to any material suitable for containing radioisotope material (e.g., preventing the leakage of radiation from inside the housing). Preferably, the housing will comprise one or more materials that possess both radiation-shielding characteristics along with excellent heat-transferring properties. Examples of such materials are known in the art. The housing may be made by forming composite particles into a wall-like body as a shield by hot-press (or cold-press) forming. The core of a composite particle may made of a material selected from the group comprising polyethylene, polystyrene, polypropylene, bakelite, graphite, beryllium, oxides of beryllium, boron, compounds of boron, aluminum, oxides of aluminum, iron, ferroalloys, lead, lead alloys, gadolinium, oxides of gadolinium, cadmium, cadmium alloys, indium, indium alloys, hafnium, hafnium alloys, depleted uranium, and the like. As shown in FIG. 2, the housing may further comprise a high-emittance coating 13 to aid in the dissipation of heat generated from the radioisotope. In such embodiments, the coating material of high thermal conductivity may include, but are not limited to, anodized aluminum, aluminum oxide, zinc oxide, magnesium oxide, composites thereof and combinations thereof. In preferred aspects, the high-emittance coating is anodized aluminum. The coating material does not necessarily need to cover the whole surface of the core particle. It is desirable, however, to cover the whole surface in order to increase the thermal conductivity among composite particles by ensuring a large contact area of composite particles. In another embodiment, the housing 2 may also be of any shape, for example, conical, cubic, cylindrical, and the like.

In another aspect, and as shown in FIG. 2, the device 1 may further comprise one or more additional heat sinks 14 in thermal communication with the high-energy emitting source 6. As used herein, the term "heat sink" refers to any object that has the ability to absorb and dissipate heat from another object using thermal contact (either direct or radiant). To ensure optimal thermal contact, the surface of the heat sink generally needs to be flat and smooth. The heat sink 14 may be made from any material that is a good thermal conductor, such as, but not limited to, copper or aluminum alloy. It is also within the scope of the present disclosure that a thermally conductive grease be added to the contact portion of the heat sink to ensure optimal thermal contact. Such greases typically contain ceramic materials such as beryllium oxide and aluminum nitride, but may alternatively contain finely divided metal particles, such as colloidal silver. Optimal thermal contact between the heat sink 14 and the device 1 may also be achieved by mechanical means, such as by a clamping mechanism, screws, or thermal adhesives to firmly hold the heat sink 14 onto the device 1 without pressure that would crush or damage the device 1.

In certain applications, particularly terrestrial applications where the device 1 may come in contact with living organisms, it may be desirable to have additional insulation to help absorb any excess heat and/or contain radiation that may be emitted from the device 1. As such, and as shown in FIG. 2, it is also within the scope of the present disclosure that the device 1 may further comprise an insulation layer 15 positioned between the radioisotope 6 and the housing 2. Any insulating material may be used that is suitable for blocking heat dissipation and/or emission of radiation (e.g., alpha, beta or gamma particles). Examples of suitable insulating materials include, but are not limited to, lead, aluminum oxide and boron nitride and composites and combinations thereof.

As will be appreciated by the ordinary skilled artisan, the high-energy emitting source 6 of the present disclosure refers to any atom or combination of atoms with an unstable nucleus that undergoes radioactive decay and emits high-energy, sub-atomic particles or photons, such as alpha particles, beta particles, gamma ray(s), x-ray(s) and/or UV. Preferably, the high-energy emitting source of the present disclosure will have a half-life long enough to produce energy at a relatively continuous rate for a reasonable amount of time. In certain aspects, the high-energy emitting source will emit alpha rays. In other aspects, the high-energy emitting source will emit beta rays. In other embodiments where the light modulation device will be used for space applications, for example, as a communication device, the high-energy emitting source will preferably produce a large amount of energy per mass and volume (e.g., density). Examples of high-energy emitting sources may include, but are not limited to, thallium-204, plutonium-238, curium-244, strontium-90, polonium-210, promethium-147, caesium-137, cerium-144, ruthenium-106, cobal-60, curium-242, americium-241 and combinations thereof. In certain embodiments, the radioactive heat source is thallium-204, plutonium-238, curium-244 or strontium-90. Preferably, the high-energy emitting source is thallium-204 due to its relative high energy density emission of primarily beta particles, which reduces or avoids shielding of the device, for example.

Figure 4:
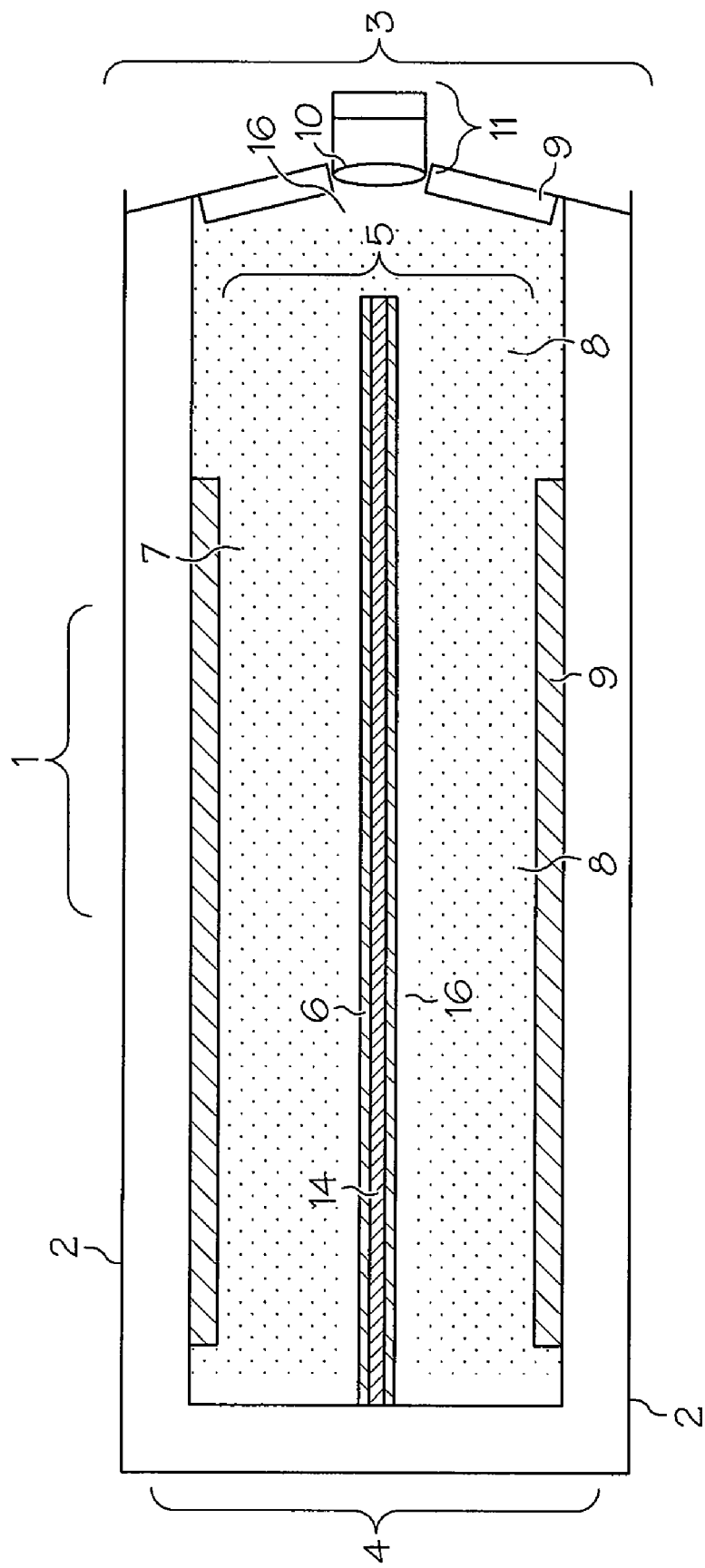
FIG. 4 represents another embodiment of a light modulation device of the disclosure.

In certain aspects, the radioisotope 6 is positioned within the inner chamber 5 of the housing 2. In one embodiment, and as shown in FIGS. 1 and 2, the radioisotope 6 may be in the form of a coating, whereby a layer of radioisotope 6 is positioned within the inner chamber 5 of the housing 2. In another embodiment, and as shown in FIG. 4, the radioisotope 6 is in the form of a block or rod centered around a heat sink 14 located within the inner chamber 5 of the housing 2. The placement of the radioisotope 6 is not critical so long as the radioisotope is in radioactive communication with the quantum dot 7 dispersed in the matrix 8. The amount of radioisotope needed will be dependent on the characteristics of the particular radioisotope and can be readily determined by one skilled in the art. For example, thallium-204 has a half-life of 3.78 years and emits a beta particle with an average energy of 245 KeV and a specific activity of 17,000 gigabecquerals per second per gram.

As will be appreciated by the ordinary skilled artisan, the term "quantum dot" ("QD") in the present disclosure is used to denote a semiconductor nanocrystal. In one aspect of the disclosure, the QD 7 comprises only one type of material, however, it is also within the scope of this disclosure that the QD comprise a core and a cap comprised of different materials (i.e. fluorescence of the QD can be increased and enhanced by using a core/cap structure). Hence, in those embodiments where fluorescence of the QD is desired, a core/cap structure may be used. Regardless of whether a single material or a core/cap structure is used, the entire QD preferably has a diameter ranging from 0.5 nm to 50 nm, more preferably from 1 nm to 40 nm, more preferably from 1 nm to 30 nm, and more preferably from 1 nm to 20 nm.

In one aspect, the QD comprises a "core" that is a nanoparticle-sized semiconductor. Any core of the II-VI semiconductors (e.g., ZnS, ZnSe, ZnTe, CdS, CdSe, CdTe, HgS, HgSe, HgTe, alloys thereof and mixtures thereof), III-V semiconductors (e.g., GaAs, GaP, GaSb, InGaAs, InAs, InP, InSb, AlAs, AlP, AlSb, alloys thereof and mixtures thereof), IV (e.g., Ge, Si) or IV-VI semiconductors (e.g., PbS, PbSe, PbTe) can be used in the context of the present disclosure. In a certain aspects, the core is a semiconductor that comprises a narrow band gap, typically less than 3 eV, preferably less than 2 eV, more preferably less than 1 eV.

In another aspect, the wavelength emitted by the QDs is selected of the physical properties of the QDs, such as the size of the nanocrystal. QDs are known to emit light from about 300 nm to about 1700 nm. Preferably, the wavelength emitted by the QDs of the present disclosure upon excitation by alpha or beta particles is in the visible to infra red (IR) wavelength regime. For example, CdSe QDs can be produced that emit colors visible to the human eye, so that in combination with a source of higher energy than the highest energy of the desired color, these QDs can be tailored to produce visible light of a spectral distribution. QDs can also be produced to emit light in the ultraviolet and infra red spectral ranges. Examples of ultraviolet- and infrared-emitting QDs include, but are not limited to, CdS, ZnS, and ZnSe, and InAs, CdTe and MgTe, respectively. Preferable wavelengths emitted by the QDs upon excitation with alpha or beta particles of the present disclosure include the range of 1 nm to $10^{11}$ nm, preferably 10 nm to $10^7$ nm, and more preferably 100 nm to $10^6$ nm.

As used herein, the term "visible light" refer to those wavelengths found on the electromagnetic spectrum between ultraviolet light and infra red light that are visible with the human eye. Typical wavelengths for visible light range between 325 nm and 800 nm in length, preferably between 350 nm and 775 nm in length, more preferably between 375 nm and 760 nm, and more preferably between 380 nm and 750 nm.

As used herein, the term "infra red light" refers to the wavelength of light which is longer than visible light but shorter than terahertz radiation and microwaves. Infra red light has a wavelength of between 750 nm and 1 mm. Of the International Commission on Illumination, infra red light encompasses three "subdivisions" based on wavelength. These include: (1) Infra Red-A (IR-A) that has a wavelength range of about 700 nm to 1400 nm; (2) Infra Red-B (IR-B) that has a wavelength range of about 1400 nm to 3000 nm; and (3) Infra Red-C (IR-C) that has a wavelength range of about 3000 nm to 1 mm. Those skilled in the art will also recognize that Infra Red light may also be subclassified of the following scheme: (1) Near-infra red (NIR) that has a wavelength of about 0.75 to 1.4 um; Short-wavelength infra red (SWIR) that has a wavelength of about 1.4 um to 3 um; (3) Mid-wavelength infra red (MWIR) that has a wavelength of about 3 um to 8 um; (4) Long-wavelength infra red (LWIR) that has a wavelength of about 8 um to 15 um; and (5) Far infra red (FIR) that has a wavelength of about 15 um to 1,000 um. All of these are within the scope of the present disclosure.

As used herein, the term "ultraviolet light" refers to those wavelengths found on the electromagnetic spectrum between visible light and soft x-rays. Ultraviolet light encompasses five "subdivisions" based on wavelength. These include: (1)

NUV (also known as Near) that has a wavelength range of 200 nm-400 nm; (2) UVA (also known as long wave or black light) that have a wavelength range of 320 to 400 nm; (3) UVB (also known as medium wave) that have a wavelength range of 280 nm to 320 nm; and (4) UVC (also known as short wave or germicidal) that have a wavelength range of below 280 nm. Those wavelengths below 280 nm have also been further subdivided to include FUV/VUV (also known as far or vacuum UV) that has a wavelength range of 10 nm to 200 nm and EUV/XUV (also known as Extreme or Deep UV) that has a wavelength range of 1 nm to 31 nm). Preferable ultraviolet light wavelengths used in the present disclosure include the range of 1 nm to 300 nm, preferably 10 nm to 280 nm, more preferably 50 nm to 275 nm, and more preferably 100 nm to 260 nm.

In another aspect, the QDs may be "tuned" by varying the composition and the size of the QD and/or adding one or more caps around the core in the form of concentric shells to widen the band gap width of the QD. As the QD approaches the excitation Bohr radius of the semiconductor of the QD, the band gap will get wider. Therefore, the smaller the QD, the wider the band gap. For example, the band gap of gallium arsenide in bulk is 1.52 electron volts (eV), while a QD consisting of 933 atoms of gallium and arsenide has a band gap of 2.8 eV, and a dot half as big, with 465 atoms, has a band gap of 3.2 eV. This results in the QD's light emission wavelength going from the red portion of the visible spectrum to the violet/ultraviolet portion of the visible spectrum. Therefore, changing the band gap, and thus the color of light a QD absorbs or emits, requires only adding or subtracting atoms from the QD.

In another aspect, it may also be desirable to tailor the size distribution of the QDs of a particular core composition to tailor the color of light which is produced by the device. The size distribution may be random, gradient, monomodal or multimodal and may exhibit one or more narrow peaks. For example, the QDs dispersed in the matrix may vary in diameter by less than a 10% rms, thus ensuring production of light in a monochromatic color. As used herein, the term "monochromatic" refers to the color generated by the QDs as comprising photons of a narrow wavelength range. In one embodiment, the wavelength range is between 10 and 100 nm, preferably between 10 and 80 nm, more preferably between 10 and 60 nm, and most preferably between 10 and 50 nm. In other embodiments, QDs of varying diameters may be used to ensure production of light in a polychromatic color. As used herein, the term "polychromatic" refers to color generated by the QDs as comprising photons of a wider wavelength range.

In another aspect, where fluorescence by the QD is desired, the core semiconductor may further comprise a "cap" or "shell." The "cap" is a semiconductor that differs from the semiconductor of the core and binds to the core, thereby forming a surface layer or shell on the core. The cap must be such that, upon combination with a given semiconductor core, results in a luminescent quantum dot. In this regard, the cap helps stabilize and enhance the fluorescence emitted by the excited core (e.g., when the core is contacted with ultraviolet light). Preferably, the cap passivates the core by having a higher band gap than the core, so the excitation of the QD is confined to the core, thereby eliminating nonradiative pathways and preventing photochemical degradation. Typical examples of QD cores include, but are not limited to, ZnO, ZnS, ZnSe, ZnTe, CdO, CdS, CdSe, CdTe, MgS, MgSe, GaSa, GaN, GaP, GaSb, HgO, HgS, HgSe, HgTe, InAs, InN, InP, InSb, AlAs, AlN, AlP, AlSb, alloys thereof, and combinations thereof. Some examples of core:cap combination which are within the scope of the present disclosure include, but are not limited to, CdS/HgS/CdS, InAs/GaAs, GaAs/AlGaAs, and CdSe/ZnS. In general, the cap is 1-10 monolayers thick, more preferably 1-5 monolayers, and most preferably 1-3 monolayers. A fraction of a monolayer is also encompassed under the present disclosure.

QDs may be synthesized in various ways. Some common methods include (1) the spontaneous generation in quantum well structures due to monolayer fluctuations in the well's thickness; (2) the capability of self-assembled QDs to nucleate spontaneously under certain conditions during molecule beam epitaxy (MBE) and metallorganic vapor phase epitaxy (MOVPE), when the material is grown in a substrate to which it is not lattice matched; (3) the ability of individual QDs to be created from two-dimensional electron or hole gases present in remotely doped quantum wells or semiconductor heterostructures; and (4) chemical methods, such as synthesizing ZnTe QDs in high-temperature organic solution (see, e.g., Zhang, J. et al. Materials Research Society Symposium Proceedings, Vol. 942, 2006). These and other processes for the synthesis of QDs are well known in the art as disclosed, for example, by U.S. Pat. Nos. 5,906,670, 5,888,885, 5,229,320, 5,482,890, and Hines, M. A. J. Phys. Chem., 100, 468-471 (1996), Dabbousi, B. O. J. Phys. Chem. B, 101, 9463-9475 (1997), Peng, X., J. Am. Chem. Soc., 119, 7019-7029 (1997), which are incorporated herein by way of reference.

Again referring to FIGS. 1 and 2, and as will be appreciated by the skilled artisan, the quantum dots 7 may be dispersed within a matrix 8. The matrix 8 refers to any material in which QDs 7 can be dispersed and that is at least partially transparent or translucent, i.e., allows light to pass through, or conductive of light from the high-energy emitting source 6. In certain aspects, the matrix 8 contains a dispersion of QDs 7, wherein the size and distribution of the QDs has been chosen to produce light of a certain wavelength. Some examples of matrix material include, but are not limited to, Sol-Gel, polyacrylate, polystyrene, polyimide, polyacrylamide, polyethylene, polyvinyl, poly-diacetylene, polyphenylene-vinylene, polypeptide, polysaccharide, polysulfone, polypyrrole, polyimidazole, polythiophene, polyether, epoxies, silica glass, silica gel, siloxane, polyphosphate, hydrogel, agarose, cellulose and the like. In preferred embodiments, the matrix is Sol Gel or polyacrylamide.

In another aspect, and as shown in FIGS. 2, 4 and 5, a physical gap 16 is present between the matrix 7 and the high-energy emitting source 6, as well as between the matrix 8 and the first and second ends 3, 4 of the device 1 to prevent evanescent wave coupling losses from the matrix 7. Preferably, the gap 16 is of sufficient size to prevent evanescent wave coupling losses. For example, the gap may be between 0.0001 and 0.1 inches, preferably between 0.001 and 0.07 inches, more preferably between 0.001 and 0.06 inches, more preferably between 0.001 and 0.065 inches, and more preferably between 0.001 and 0.0625 inches.

As will be appreciated by those skilled in the art, the term "reflector" refers to any material that is able to change the direction of a wave front at an interface between two different media so that the wave front is able to return into the medium from which it originated. In one embodiment, the reflector 9 is a material that exhibits perfect, or near perfect, specular reflection of visible and near-visible light range (e.g., ultraviolet radiation, x-ray, infrared radiation and the like). Examples of suitable reflector include, but are not limited to, mirrors, polished metals such as aluminum and stainless steel, SilverLux® and the like. In one embodiment, and as shown in FIGS. 1, 2 and 4, at least one reflector 9 is positioned along at least one side of the inner chamber 5. Preferably, at least two reflectors 9 are positioned along at least two sides of the inner chamber 5. In other embodiments, at least one reflector 9 may also be positioned along the inner portion of the of the housing 2.

As used herein, and shown in FIGS. 1 and 2, the device 1 comprises a modulator 11 in optical communication with the aperture 10. The term "modulator" refers to any device or devices that have the ability to vary one or more components of a periodic electromagnetic-waveform, for example, light waves, in order to communicate. In one embodiment, the modulator 11 comprises a transparent bulk material that imparts large and fast electro-optic effects. In another embodiment, the modulator 11 comprises a transparent material coated with a film that imparts large and fast electro-optic effects. For example the transparent material is a photochromic material. In certain aspects, the transparent material comprises electro-optic oxides. The transparent material may comprise transparent electro-optic ceramics, including, but not limited to, $LiNbO_3$, $Pb_{1-x}La_x(Zr_yTi_{1-y})_{1-x/4}O_3$ (PLZT), $Pb(Mg_{1/3}Nb_{2/3})O_3$—$PbTiO_3$ (PMN-PT), and $Pb(Zn_{1/3}Nb_{2/3})O_3$—$PbTiO_3$ (PZN-PT).

In another aspect, and as shown in FIG. 2, the modulator 11 further comprises a focusing element 17. As used herein, the term "focusing element" refers to any object that enables particles or waves to converge. This narrowing may mean to cause the directions of motion to become more aligned in a specific direction (e.g., collimated or parallel) or to cause the spatial cross section of the beam to become smaller, or to cause the light to converge to a single point. The focusing element may include a curved (e.g., concave or convex) mirror or lens. Preferably, the focusing element comprises a lens.

In one aspect, and as shown in FIG. 6A, the light generated by the QDs within the device 1 are modulated by digitally field switching the electro-optic material found in the modulator 11 so that the light emanating from the aperture 10 would be either transmitted or attenuated at a rate sufficient to produce a communications signal 18. Preferably, the transmission or attenuation rate is less than 200 nanoseconds, preferably less than 150 nanoseconds, and most preferably less than 100 nanoseconds. The signal may be binary or may be optical. By way of example, binary communication signals 18 can then be collected by a receiver 19 which turns these optical signals into an electrical signal that represents the information transmitted. In another embodiment, a collector means 20, for example, an optical sensor or parabolic dish, may be used to concentrate the modulated light to a sensor or sensor array 21 that would be coupled to an optical-to-electrical transformation device. The receiver 19 would first be synchronized to derive the signal timing rate. A protocol would be used to determine when the set of 1's and 0's begins and ends, the 1's and 0's being whether the light has been transmitted or not. In certain embodiments, the receiver 19 further comprises a display means. In other embodiments, the receiver 19 is connected to a separate display means 22, such as a computer.

In another embodiment, and as shown in FIG. 6B, the communication will be for very long distance transmission (e.g., between earth and a point in space or low-earth orbit). In this embodiment, the receiver 19 is a receiving station that may use a light gathering instrument 23, such as a telescope, coupled with a low-light optical detector 24, such as a photomultiplier or low light photodiode detector or other low light device, to detect or amplify the signal. These signals would then be transmitted to a receiver 19 and displayed to a user via a display means 22.

Figure 7A:
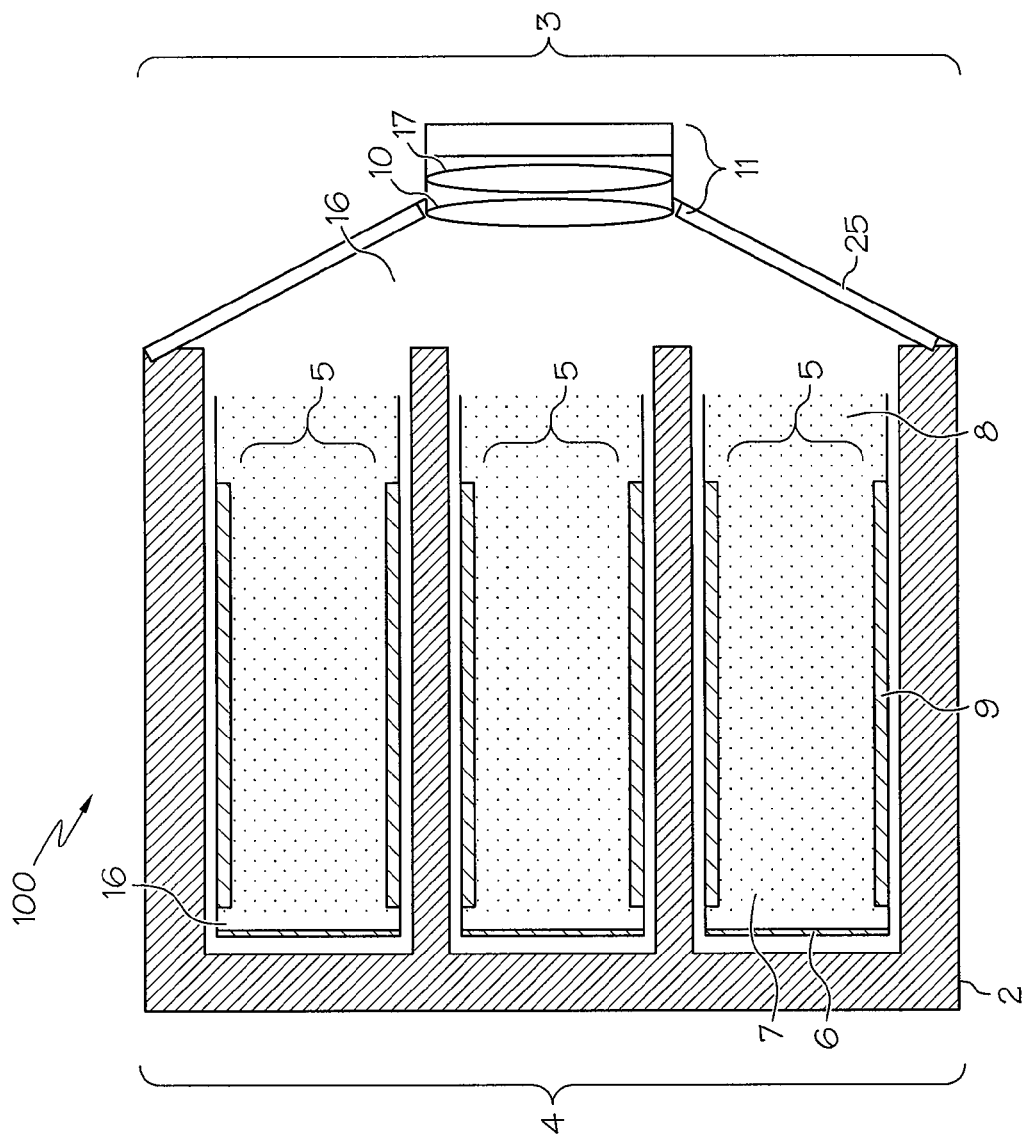
FIG. 7A represents a stacked concentrator light modulation embodiment of the present disclosure.

In another aspect of the present disclosure, and as depicted in FIG. 7A, a concentrator stack 100 is provided to further increase the intensity, coherence, and/or output of the device. Thus, concentrator stack 100 comprises a housing 2, an opening proximal to first end 3, a second end 4 and a plurality of inner chambers 5. With each inner chamber 5 is a plurality of quantum dots 7 that are dispersed in a matrix 8 and positioned within the plurality of inner chambers 5. Further, a plurality of reflectors 9 are positioned within the plurality of inner chambers 5 and in optical communication with the plurality of quantum dots 7. A plurality of high-energy emitting sources 6 are positioned within the plurality of inner chambers 5 and in radioactive communication with the plurality of quantum dots 7. By way of example, a second reflector 25 is positioned proximal the opening at first end 3 of the housing 2. An aperture 10 is positioned proximal the opening at first end 3 of the housing 2 and in optical communication with the quantum dots 7 found in the plurality of inner chambers 5. A modulator 11 is positioned proximal the opening at first end 3 of the housing 2 and in optical communication with the aperture 10. In certain embodiments, the modulator further comprises a focusing element 17.

Figure 7B:
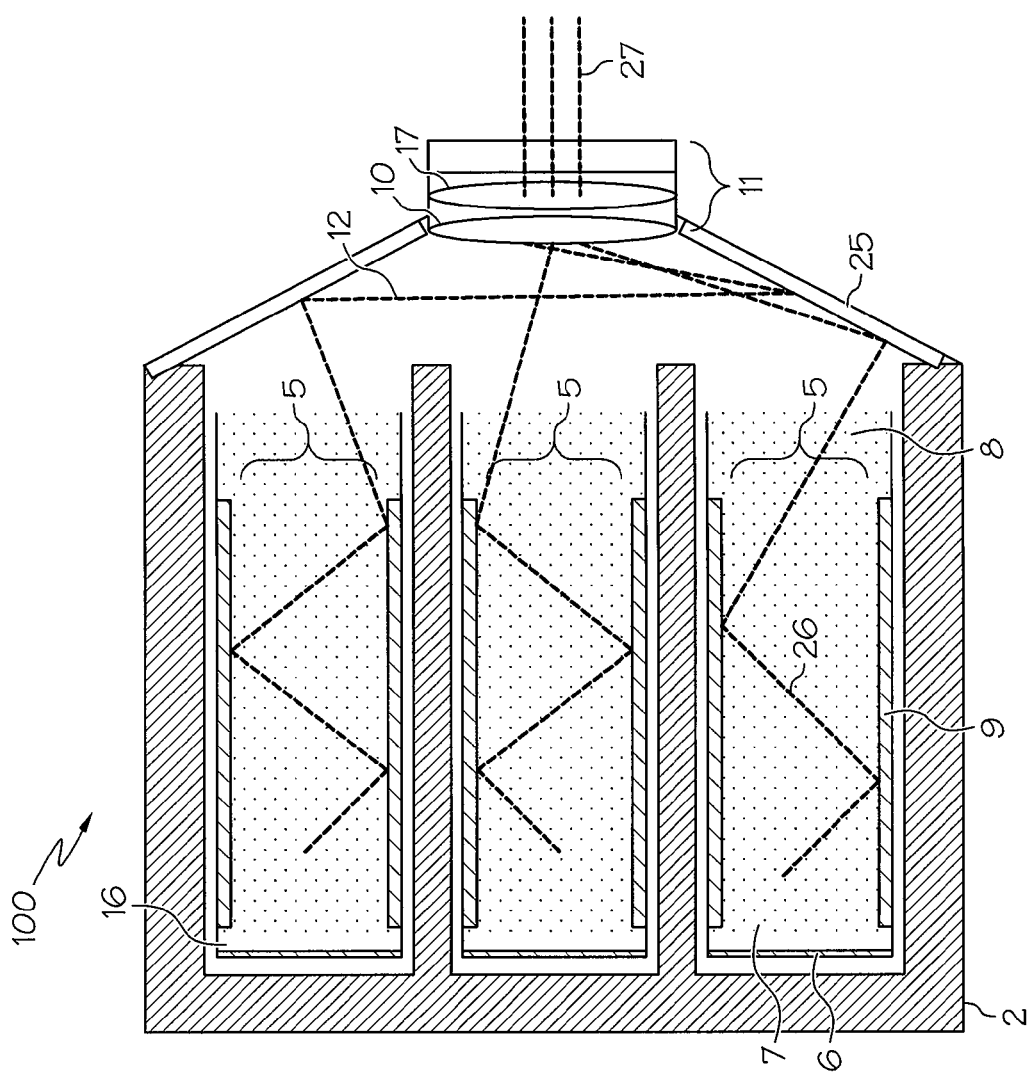
FIG. 7B is a schematic representing how monochromatic light is generated by a light modulation device of the present disclosure.

In one aspect, and shown in FIG. 7B, where only one color of light is to be produced, each inner chamber 5 comprises quantum dots 7 of the same type (e.g. the same diameter) dispersed in a matrix 8. The light 26 generated by the quantum dots 7 upon activation by alpha or beta particles emitted by the high-energy emitting source 6 will be amplified and reflected by the a first reflector 9 and a second reflector 25, passed through the aperture 10, and modulated by the modulator 11 to produce a beam of monochromatic light 27.

Figure 7C:
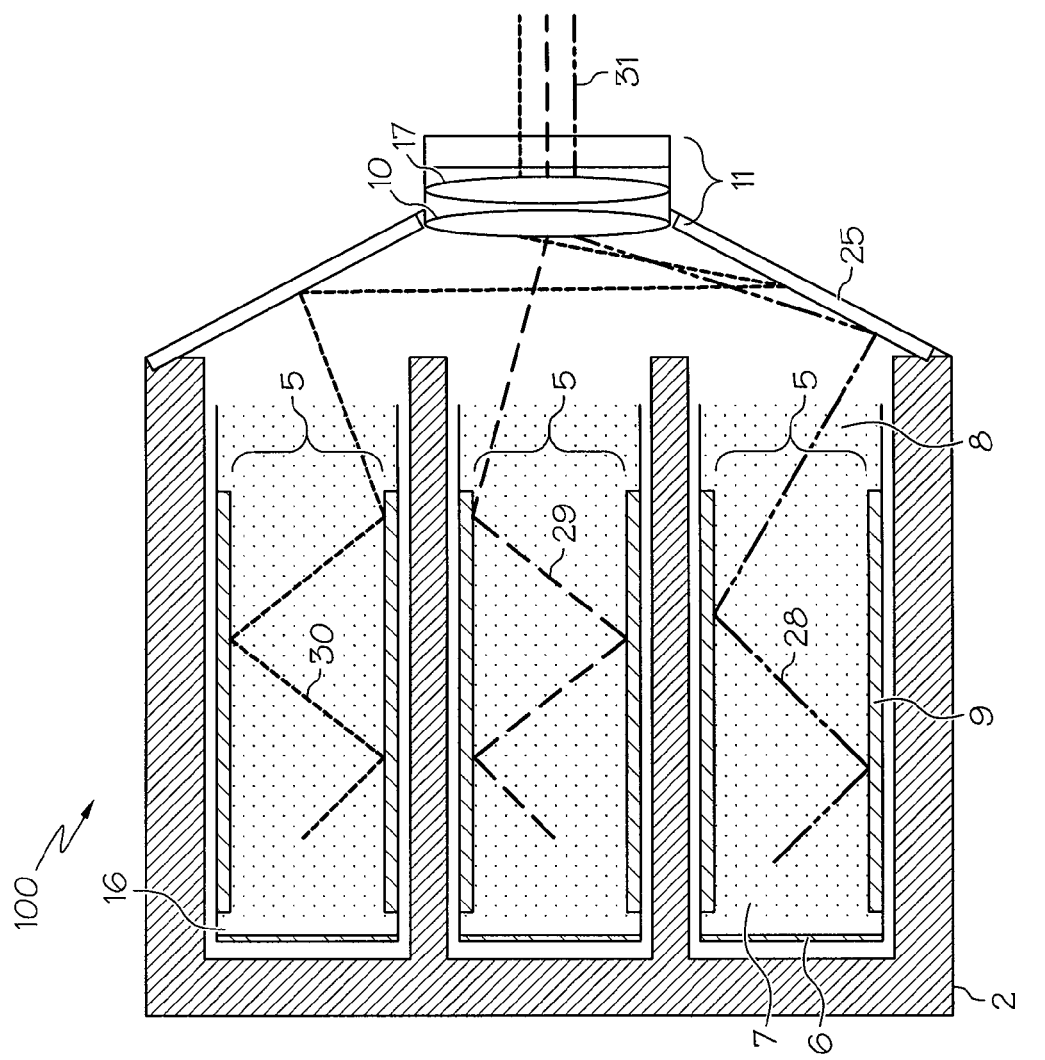
FIG. 7C is a schematic representing how polychromatic light generated by a light modulation device of the present disclosure.

In another aspect, more than one color of light may be produced. When generating more than one color of light, it is usually desirable that the QDs be isolated from each other within the matrix. For example, when two QDs of different sizes are in close contact, the larger QD, which has a lower characteristic emission energy, will tend to absorb a large fraction of the emissions of the smaller QD, and the overall energy efficiency of the device will be reduced, while the color will shift towards the red. To avoid such problems, and as shown in FIG. 7C, it is also within the scope of the present disclosure to comprise a concentrator stack 100 that comprises a plurality of inner chambers 5, where each inner chamber 5 comprises quantum dots 7 of different types (e.g. different diameters), which may be dispersed in a matrix 8. The light of different colors 28, 29, 30 is then generated by the quantum dots 7 upon activation by the high-energy emitting source 6 and amplified and reflected by the first reflector 9 and second reflector 25, passed through the aperture 10, and modulated by the modulator 11 to produce a beam of polychromatic light 31.

Figure 7D:
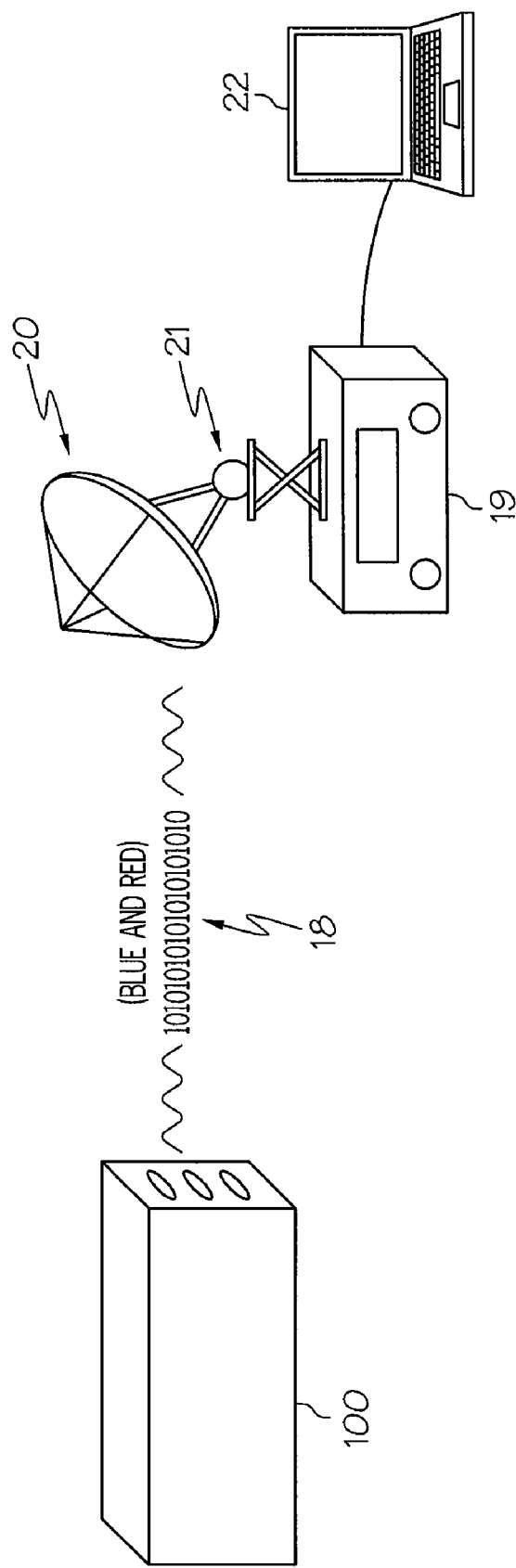
FIG. 7D is a schematic representing how polychromatic light generated by a light device of the present disclosure is transmitted, gathered and processed.

As shown in FIG. 7D, the polychromatic photon emitted from the concentrator stack device 100 would have wavelengths sufficiently separated so that the receiver 19 can determine what wavelength signal it is receiving. For example, the binary communications signal 18 could have the 1's and 0's represented by the different colors or wavelengths as in a parallel binary communications system. In yet another embodiment, by varying the length of the modulations or by alternating colors or wavelengths, the photons emitted from the concentrator stack device 100 could be sent as Morse code.

In yet another aspect, the present disclosure provides a method of producing a light modulation communication device of the present disclosure. The method comprises providing a housing having an opening, and an inner chamber; providing at least one quantum dot dispersed in a matrix; providing a high-energy emitting source positioned within the inner chamber and in radioactive communication with the at least one quantum dot; providing at least one reflector positioned within the inner chamber and in optical communication with the at least one quantum dot; providing an aperture positioned proximal the opening of the housing and in optical communication with the at least one quantum dot; and providing a modulator positioned at in optical communication with the aperture.

These and other aspects of the disclosure may become more readily apparent in connection with the following representative examples which are presented for purposes of illustration and not by way of limitation.

It is understood that the foregoing detailed description and the following examples are illustrative only and are not to be taken as limitations upon the scope of the disclosure. Various changes and modifications to the disclosed embodiments, which will be apparent to those skilled in the art, may be made without departing from the spirit and scope of the present disclosure. Further, all patents, patent applications and publications cited herein are incorporated herein by reference.

We claim:

1. A light modulating communication device comprising:
a housing comprising at least one inner chamber, and an opening;
at least one quantum dot positioned inside the at least one inner chamber;
a high-energy emitting source positioned within the at least one inner chamber;
the at least one quantum dot is physically separated from both of the high-energy emitting source, and the opening by a gap, the gap sized to prevent evanescent wave coupling losses;
a modulator positioned proximal to the opening of the housing;
optionally, at least one reflector positioned within the at least one inner chamber.

2. The device of claim 1, further comprising a reflector positioned within the at least one inner chamber and an aperture positioned proximal to the opening of the housing.

3. The device of claim 1, wherein the quantum dot comprises:
(i) a core selected from the group consisting of CdS, CdSe, CdTe, ZnS, ZnS, ZnSe, ZnTe, GaAs, GaP, GaAs, GaSb, HgS, HgSe, HgTe, InAs, InP, InSb, AlAs, AlP, AlSb, PbS, PbSe, PbTe;
(ii) a cap selected from one or more of the group consisting of ZnO, ZnS, ZnSe, ZnTe, CdO, CdS, CdSe, CdTe, MgS, MgSe, GaAs, GaN, GaP, GaSb, HgO, HgS, HgSe, HgTe, InAs, InN, InP, InSb, AlAs, AlN, AlP, AlSb; and
(iii) combinations of (i) and (ii).

4. The device of claim 1, further comprising a matrix containing the quantum dot, the matrix selected from at least one of the group of materials consisting of Sol Gel, polyacrylate, polystyrene, polyimide, polyacrylamide, polyethylene, polyvinyl, poly-diacetylene, polyphenylene-vinylene, polypeptide, polysaccharide, polysulfone, polypyrrole, polyimidazole, polythiophene, polyether, epoxies, silica glass, silica gel, siloxane, polyphosphate, hydrogel, agarose, and cellulose.

5. The device of claim 4, wherein the matrix is transparent or translucent.

6. The device of claim 1, wherein the high-energy emitting source is a radioisotope selected from the group of radioisotopes consisting of thallium-204, plutonium-238, curium-244, strontium-90, polonium-210, promethium-147, caesium-137, cerium-144, ruthenium-106, cobal-60, curium-242, and americium-241.

7. The device of claim 1, wherein the at least one quantum dot is physically separated from both the high-energy emitting source, and the opening within the at least one interior chamber by a gap of between 0.0001 and 0.1 inches.

8. The device of claim 1, wherein the modulator is an electro-optic oxide selected from the group of materials consisting of $LiNbO_3$, $Pb_{1-x}La_x(Zr_yTi_{1-y})_{1-x/4}O_3$ (PLZT), $Pb(Mg_{1/3}Nb_{2/3})O_3$—$PbTiO_3$ (PMN-PT), and $Pb(Zn_{1/3}Nb_{2/3})O_3$—$PbTiO_3$ (PZN-PT).

9. The device of claim 1, further comprising a focusing element.

10. The device of claim 1, wherein the housing comprises a plurality of inner chambers; each inner chamber comprising:
the at least one quantum dot;
the high-energy emitting sources;
the device optionally comprising one or both of:
a secondary reflector positioned adjacent the plurality of inner chambers; or
an aperture positioned proximal to the opening of the housing;
whereby a light modulating communication concentrator stack is provided.

11. The device of claim 10, wherein quantum dots of the same diameter are distributed within the plurality of inner chambers, or wherein quantum dots of different diameters are substantially distributed by their respective diameters within the plurality of inner chambers.

12. The device of claim 1, further comprising a light-collecting receiver operably coupled to the device and capable of and converting collecting light emitted from the device into an electrical signal, and a display operably coupled to the electrical signal.

13. The device of claim 12, further comprising a light concentrator operably coupled to a sensor or sensor array, the sensor array operably coupled to the receiver.

14. A light modulating communication device comprising:
a housing comprising at least one inner chamber, and an opening;
at least one quantum dot positioned inside the inner chamber, wherein the quantum dot comprises CdS, CdSe, CdTe, ZnS, or ZnSe;
a high-energy emitting source positioned within the at least one inner chamber, wherein the high-energy emitting source is a radioisotope; the at least one inner chamber having an opening, the at least one quantum dot physically separated from the high-energy emitting source and the opening by a gap, the gap sized to prevent evanescent wave coupling losses;
at least one reflector positioned within the at least one inner chamber; and
a modulator positioned proximal to the opening of the housing, wherein the modulator is $LiNbO_3$ or $Pb_{1-x}La_x(Zr_yTi_{1-y})_{1-x/4}O_3$ (PLZT).

15. A method comprising:
providing at least one quantum dot;
providing a source emitting high-energy particles; the source emitting high-energy particles are contained in a housing having an opening, wherein the at least one quantum dot is physically separated from the source emitting high-energy particles and the opening by a gap, the gap sized to prevent evanescent wave coupling losses;
contacting the at least one quantum dot with high-energy particles such that light is produced from the at least one quantum dot;

modulating the light produced from the at least one quantum dot, wherein modulated light is produced.

16. The method of claim 15, further comprising modulating the light at a rate sufficient to produce a communication signal.

17. The method of claim 15, further comprises amplifying the light by reflecting the light with a reflector and passing the amplified light through an aperture.

18. The method of claim 15, wherein the at least one quantum dot comprises:
 (i) a core selected from the group consisting of CdS, CdSe, CdTe, ZnS, ZnS, ZnSe, ZnTe, GaAs, GaP, GaAs, GaSb, HgS, HgSe, HgTe, InAs, InP, InSb, AlAs, AlP, AlSb, PbS, PbSe, PbTe;
 (ii) a cap selected from one or more of the group consisting of ZnO, ZnS, ZnSe, ZnTe, CdO, CdS, CdSe, CdTe, MgS, MgSe, GaAs, GaN, GaP, GaSb, HgO, HgS, HgSe, HgTe, InAs, InN, InP, InSb, AlAs, AN, AlP, AlSb; and
 (iii) combinations of (i) and (ii).

19. The method of claim 15, wherein the high-energy emitting source is a radioisotope selected from the group of radioisotopes consisting of thallium-204, plutonium-238, curium-244, strontium-90, polonium-210, promethium-147, caesium-137, cerium-144, ruthenium-106, cobal-60, curium-242, and americium-241.

20. The method of claim 15, wherein the modulator is an electro-optic oxide selected from the group of materials consisting of $LiNbO_3$, $Pb_{1-x}La_x(Zr_yTi_{1-y})_{1-x/4}O_3$ (PLZT), $Pb(Mg_{1/3}Nb_{2/3})O_3$—$PbTiO_3$ (PMN-PT), and $Pb(Zn_{1/3}Nb_{2/3})O_3$—$PbTiO_3$ (PZN-PT).

* * * * *